United States Patent
Tanaka et al.

(10) Patent No.: US 9,035,512 B2
(45) Date of Patent: May 19, 2015

(54) LINEAR ACTUATOR

(71) Applicant: SANYO DENKI CO., LTD., Tokyo (JP)

(72) Inventors: Masanori Tanaka, Nagano (JP);
Shigenori Miyairi, Nagano (JP)

(73) Assignee: SANYO DENKI CO., LTD., Tokyo (JP)

( * ) Notice: Subject to any disclaimer, the term of this patent is extended or adjusted under 35 U.S.C. 154(b) by 393 days.

(21) Appl. No.: 13/661,254

(22) Filed: Oct. 26, 2012

(65) Prior Publication Data

US 2013/0104679 A1 May 2, 2013

(30) Foreign Application Priority Data

Oct. 28, 2011 (JP) .................................. 2011-237201

(51) Int. Cl.
| | |
|---|---|
| H02K 7/06 | (2006.01) |
| F16H 25/22 | (2006.01) |
| F16H 25/24 | (2006.01) |
| F16H 25/20 | (2006.01) |

(52) U.S. Cl.
CPC ................. H02K 7/06 (2013.01); F16H 25/24 (2013.01); F16H 25/20 (2013.01); Y10T 74/18576 (2015.01); F16H 2025/2078 (2013.01)

(58) Field of Classification Search
None
See application file for complete search history.

(56) References Cited

U.S. PATENT DOCUMENTS

| | | | | |
|---|---|---|---|---|
| 4,381,747 A | * | 5/1983 | Kobayashi et al. | ...... 123/339.26 |
| 4,412,517 A | * | 11/1983 | Kobashi et al. | ........ 123/339.26 |
| 6,776,254 B1 | | 8/2004 | Brunnschweiler et al. | |
| 2011/0138947 A1 | * | 6/2011 | Nakatake et al. | .......... 74/424.81 |
| 2011/0140557 A1 | | 6/2011 | Miyairi et al. | |

FOREIGN PATENT DOCUMENTS

| | | |
|---|---|---|
| DE | 102006055689 A1 | 5/2008 |
| EP | 2333379 A2 | 6/2011 |
| FR | 2065167 A5 | 7/1971 |
| GB | 1322925 A | 7/1973 |
| JP | 2002-372117 | 12/2002 |
| JP | 2002-372118 | 12/2002 |
| JP | 2010-236598 A | 10/2010 |
| JP | 2011-141027 | 7/2011 |
| JP | 2011-142802 | 7/2011 |
| WO | 01/40046 A1 | 6/2001 |
| WO | 2007/115701 A1 | 10/2007 |
| WO | 2008/095812 A1 | 8/2008 |

OTHER PUBLICATIONS

European Search Report dated Feb. 25, 2013, Application No. 12275161, 8 pages.

* cited by examiner

*Primary Examiner* — Tran Nguyen
(74) *Attorney, Agent, or Firm* — Rankin, Hill & Clark LLP (57) ABSTRACT

At least a rotor fixing portion and a bearing fitting portion are combined to form a hollow rotary shaft. The rotor of a rotary motor portion is fixed on the rotor fixing portion. A thrust radial bearing is fitted on the outer periphery of the bearing fitting portion and a screw nut is fitted to the bearing fitting portion. The rotor fixing portion and the bearing fitting portion are coupled with screw member(s) which are inserted into the hollow rotary shaft from one axial end of the hollow rotary shaft and axially extend inside the bearing fitting portion and the rotor fixing portion. A flange portion of the screw nut is fixed on an abutment portion of the bearing fitting portion in abutment with an end surface of an inner race of the thrust radial bearing that is located on the one axial end side.

12 Claims, 3 Drawing Sheets

Fig. 1

LINEAR ACTUATOR

TECHNICAL FIELD

The present invention relates to a linear actuator for transforming a rotating movement of a screw nut that rotates together with a hollow rotary shaft to a linear movement of an output screw shaft that is screwed with the screw nut and moves inside the hollow rotary shaft.

BACKGROUND ART

Figure 3:
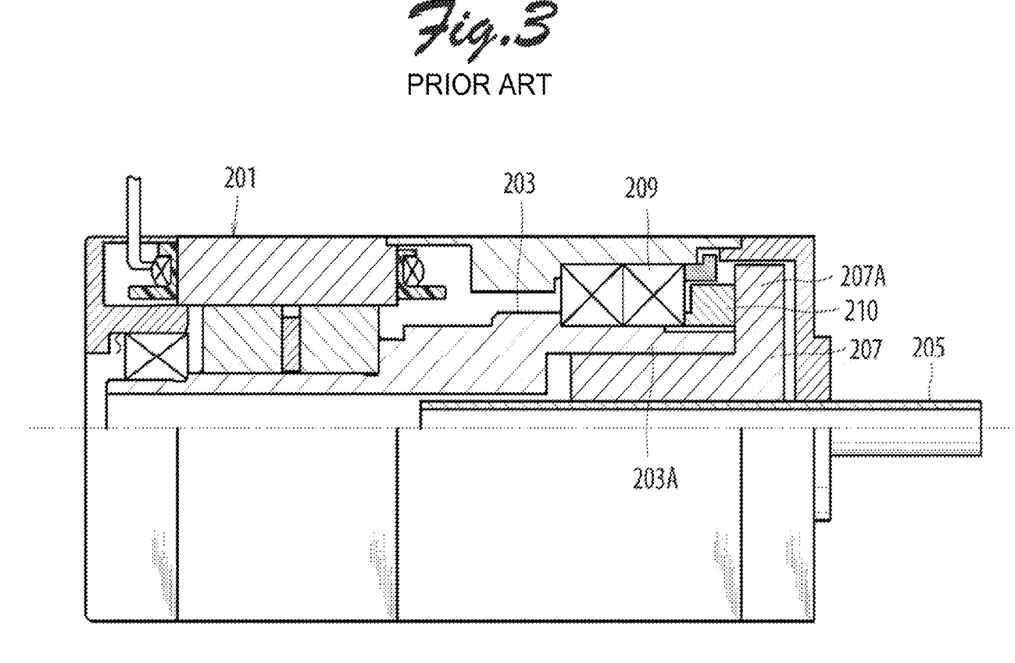
FIG. 3 is a half sectional view showing a structure of a related art linear actuator.

Japanese Patent Application Publication No. 2002-372117 (Patent Document 1), Japanese Patent Application Publication No. 2002-372118 (Patent Document 2), Japanese Patent Application Publication No. 2011-141027 (Patent Document 3), and Japanese Patent Application Publication No. 2011-142802 (Patent Document 4) each disclose a structure of a linear actuator comprising a motor portion 201; an output screw shaft 205; a screw nut 207; a thrust radial bearing 209; a lock nut 210; and a bolt not shown. The motor portion 201 includes a hollow rotary shaft 203. The output screw shaft 205 is operable to coaxially pass through the hollow rotary shaft 203. The screw nut 207 is located inside the hollow rotary shaft 203 and is screwed onto the output screw shaft 205. The screw nut 207 includes a flange portion 207A projecting radially outwardly from one axial end 203A of the hollow rotary shaft 203. The thrust radial bearing 209 is operable to rotatably support the hollow rotary shaft 203 on the side of the one axial end 203A of the hollow rotary shaft 203. The lock nut 210 is screwed onto the outer peripheral surface of the hollow rotary shaft 203 on the side of the one axial end 203A to fix the thrust radial bearing 209. The bolt not shown is operable to fix the flange portion 207A of the screw nut 207 to the lock nut 210 (refer to FIG. 3).

SUMMARY OF THE INVENTION

In the conventional linear actuator, the thrust radial bearing may be firmly fixed by the lock nut and the outer peripheral surface of the hollow rotary shaft on the axial end side. However, due to the structure of screwing the lock nut onto the outer peripheral surface of the hollow rotary shaft on the axial end side, it is necessary to consider tightening workability of the lock nut, loosening of the lock nut, an axial deviation between the hollow rotary shaft and the output screw shaft, and the like. For that reason, in the related art linear actuator using the lock nut, high assembling accuracy is required between the hollow rotary shaft and the lock nut, leading to an increase in manufacturing cost. Thus, a linear actuator is desirable in which a thrust radial bearing may be fixed without using a lock nut.

An object of the present invention is to provide a linear actuator that eliminates the need for using a lock nut.

Another object of the present invention is to provide a linear actuator that is easy to assemble even if a thrust radial bearing is fixed without using a lock nut.

Still another object of the present invention is to provide a linear actuator in which an axial deviation between a hollow rotary shaft and an output screw shaft will scarcely occur.

A linear actuator, the improvement of which is aimed at in the present invention, comprises a rotary motor portion, an output screw shaft, a screw nut, and a thrust radial bearing. The rotary motor portion includes a rotor and a hollow rotary shaft. The output screw shaft is disposed coaxially with the hollow rotary shaft and operable to move inside the hollow rotary shaft. The screw nut includes a screw portion located inside the hollow rotary shaft and screwed onto the output screw shaft. The flange portion is unitarily formed with the screw portion and projecting radially outwardly from one axial end of the hollow rotary shaft. The thrust radial bearing is operable to rotatably support the hollow rotary shaft on the one axial end side. A known motor such as a stepping motor, a servo motor, or the like may be used for the motor portion.

In the linear motor of the present invention, the hollow rotary shaft is formed by combining at least a rotor fixing portion on which the rotor of the rotary motor portion is fixed; and a bearing fitting portion. The screw nut is fixed to the bearing fitting portion, and the thrust radial bearing is fitted on the outer periphery of the bearing fitting portion. The rotor fixing portion and the bearing fitting portion are coupled with one or more screw members which are inserted into the hollow rotary shaft from the one axial end of the hollow rotary shaft and axially extend inside the bearing fitting portion and the rotor fixing portion.

The bearing fitting portion is configured to be unitarily formed with an abutment portion which abuts onto an end surface of the inner race of the thrust radial bearing that is located on the one axial end side. The flange portion of the screw nut is fixed on the abutment portion of the bearing fitting portion.

When the rotor fixing portion and the bearing fitting portion are combined to form the hollow rotary shaft as in the present invention, the thrust radial bearing may be fixed to the one axial end side of the hollow rotary shaft, without using a lock nut. For that reason, manufacturing cost of the linear actuator may be greatly reduced. Further, since the structure without using the lock nut is adopted in the linear actuator, the need for considering various problems (such as tightening workability of the lock nut, loosening of the lock nut, axial deviation between the hollow rotary shaft and the output screw shaft and the like) that have arisen in the conventional linear actuators is eliminated. Further, the abutment portion of the bearing fitting portion abuts onto the end surface of the inner race of the thrust radial bearing that is located on the one axial end side. Thus, even if the lock nut is not used, the thrust radial bearing may thereby be firmly fixed between the hollow rotary shaft and the screw nut.

Preferably, the rotor fixing portion is configured to be unitarily formed with an abutment portion which abuts onto an end surface of the inner race of the thrust radial bearing that is opposite to the end surface located on the one axial end side. When the rotor fixing portion is configured as mentioned above, the end surface of the inner race of the thrust radial bearing that is opposite to the end surface located on the one axial end side is supported by the abutment portion of the rotor fixing portion, with the end surface of the inner race of the thrust radial bearing located on the one axial end side supported by the abutment portion of the bearing fitting portion. Thus, when the rotor fixing portion and the bearing fitting portion are combined, the thrust radial bearing may be prevented from moving.

A joint member may be disposed between the rotor fixing portion and the bearing fitting portion. In this case, the joint member is structured to include a first fitting concave portion fitted with an end of the rotor fixing portion that is located on the one axial end side; a second fitting concave portion fitted with an end of the bearing fitting portion that is located on an opposite side to the one axial end side; and a partition portion located between the rotor fixing portion fitted in the first concave portion and the bearing fitting portion fitted in the second fitting concave portion. Then, the bearing fitting portion, the joint member, and the rotor fixing portion are coupled with the one or more screw members that axially extend inside the bearing fitting portion, the partition portion of the joint member, and the rotor fixing portion. When such a joint member is used, positioning of the rotor fixing portion and the bearing fitting portion is facilitated. Further, since the rotor fixing portion and the bearing fitting portion may be securely assembled through the joint member, a variation in the order of assembly of the linear actuator may be increased.

Preferably, the joint member is configured to be unitarily formed with an abutment portion which abuts onto an end surface of the inner race of the thrust radial bearing that is opposite to the end surface of the inner race of the thrust radial bearing located on the one axial end side. When the joint member is configured as mentioned above, the end surface of the inner race of the thrust radial bearing that is opposite to the end surface of the inner race of the thrust radial bearing located on the one axial end side is supported by the abutment portion of the joint member, with the end surface of the inner race of the thrust radial bearing on the one axial end side supported by the abutment portion of the bearing fitting portion. For that reason, even when the rotor fixing portion and the bearing fitting portion are combined using the joint member, the thrust radial bearing may be prevented from moving.

In the linear actuator of the present invention, the rotary motor portion includes a stator portion and a rotor portion. The stator portion is constituted from a stator core and a winding portion attached to the stator core. The rotor portion is fixed to the rotor fixing portion. Preferably, the linear actuator of the configuration including such a rotary motor portion further includes a first end bracket, an intermediate bracket, and a second end bracket. The first end bracket is fitted with an end of the stator core that is located on an opposite side to the one axial end side. The intermediate bracket is fitted with an end of the stator core that is located on the one axial end side and is also fitted with the outer race of the thrust radial bearing. The second end bracket is fitted with an end of the intermediate bracket that is located on the one axial end side, with the output screw shaft penetrating therethrough. Preferably, the intermediate bracket has a first abutment portion and a second abutment portion formed therein. The first abutment portion abuts onto an end surface of the outer race of the thrust radial bearing that is located on the opposite side to the one axial end side, and the second abutment portion abuts onto a bearing retaining plate in abutment with an end surface of the outer race of the thrust radial bearing that is located on the one axial end side. When the linear actuator is configured as mentioned above, the outer race of the thrust radial bearing is further supported by the intermediate bracket and the bearing retaining plate, with the inner race of the thrust radial bearing supported by the bearing fitting portion and the rotor fixing portion or the joint member. The thrust radial bearing may therefore be prevented from moving. Even if a configuration like the present invention without using a lock nut is adopted, the casing of the linear actuator may be formed by the first end bracket, the stator core, the intermediate bracket, and the second end bracket while securely fixing the thrust radial bearing as mentioned above.

The portion where the intermediate bracket and the end of the stator core on the axial end side are fitted together may be arbitrarily shaped. It may be so arranged, for example, that a step is formed at an end of the radially outward outer peripheral surface of the stator core on the axial end side. An end of the intermediate bracket that is located on the opposite side to the one axial end side may be fitted in the step. In the fitting structure fitting the stator core and the intermediate bracket together on the side of the outer wall surface of the stator core, positioning of the stator core and the intermediate bracket is performed at a location farthest from the axial core of the hollow rotary shaft in a radial direction. An axial deviation between the hollow rotary shaft and the output screw shaft therefore tends to occur. Then, preferably, in the present invention, a fitted portion including a reference surface in contact with an inner peripheral surface of the stator core is unitarily formed with an end of the intermediate bracket that is located on the opposite side to the one axial end side. Dimensions of this reference surface are defined so that the fitted portion of the intermediate bracket contacts the inner peripheral surface of the stator core without contacting magnetic pole portions (pole teeth) in the stator core. When such a fitting structure fitting the stator core and the intermediate bracket together on the side of the inner peripheral surface of the stator core is adopted, positioning of the stator core and the intermediate bracket may be performed at a location closest to the axial core of the hollow rotary shaft in the radial direction. The linear actuator may therefore be made to have a structure in which an axial deviation between the hollow rotary shaft and the output screw shaft will scarcely occur. Further, a contact surface between the stator core and the intermediate bracket may be increased. Consequently, motor rigidity may be increased. Oscillation and noise may therefore be reduced.

BRIEF DESCRIPTION OF THE DRAWINGS

These and other objects and many of the attendant advantages of the present invention will be readily appreciated as the same becomes better understood by reference to the following detailed description when considered in connection with the accompanying drawings.

DETAILED DESCRIPTION OF EMBODIMENTS

Figure 1:
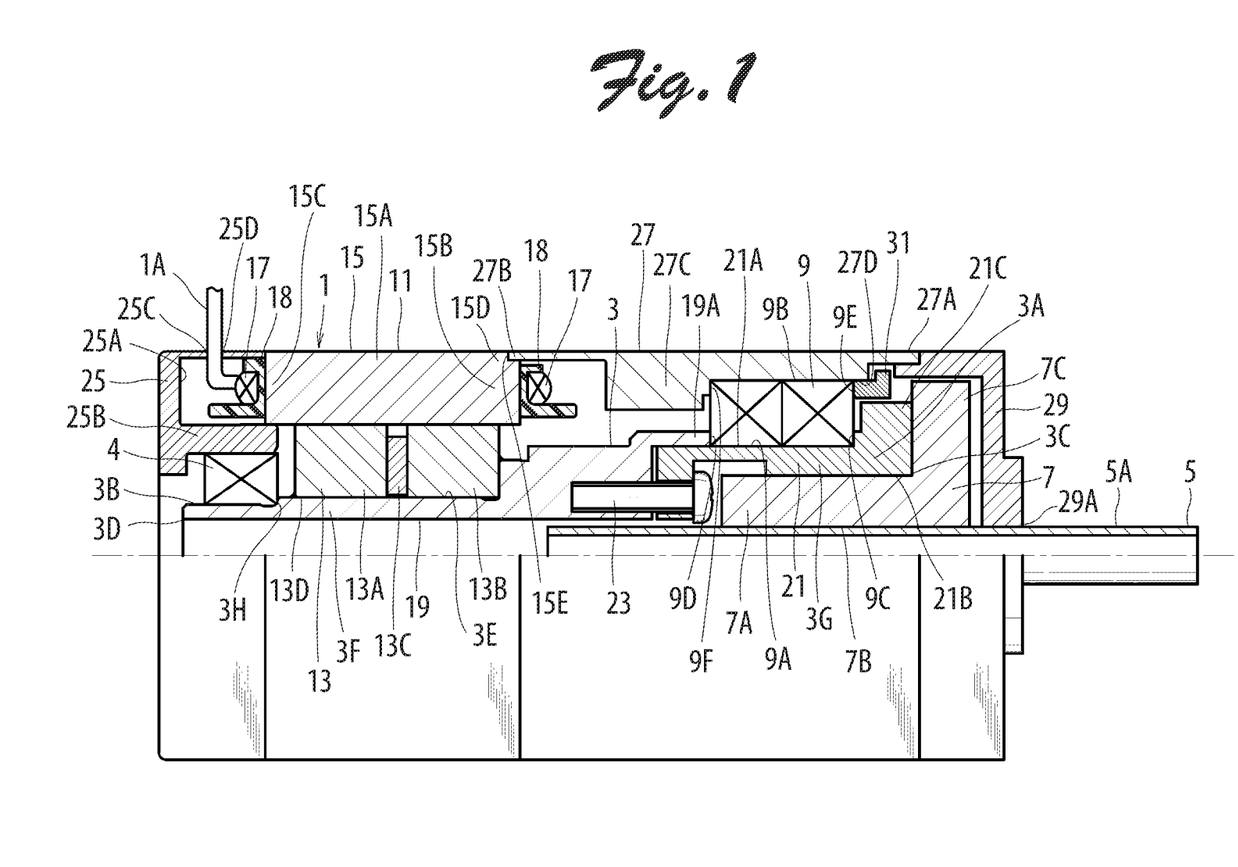
FIG. 1 is a half sectional view showing an example of a linear actuator in an embodiment of the present invention.

Embodiments of a linear actuator of the present invention will be described below in detail. FIG. 1 is a half sectional view showing an example of an embodiment of a linear actuator, in which a rotary stepping motor is used as a driving source. As shown in FIG. 1, a main portion of the linear actuator is constituted from a rotary motor portion 1 constituted from the stepping motor, a hollow rotary shaft 3, an output screw shaft 5, a screw nut 7, and a thrust radial bearing 9.

The rotary motor portion 1 is constituted from a stator portion 11 and a rotor portion 13. The stator portion 11 is further constituted from a stator core 15 and a winding portion 17 attached to the stator core 15. The stator core 15 includes a plurality of magnetic pole portions not shown that are arranged on the inner peripheral surface of a yoke 15A at equal intervals. A plurality of small teeth not shown are formed on magnetic pole surfaces of the plurality of magnetic pole portions. The winding portion 17 is mounted on each of the plurality of magnetic pole portions of the stator core 15 through an insulator 18. The rotor portion 13 is constituted from two rotor stacks 13A and 13B and a permanent magnet 13C. A plurality of small teeth not shown are formed on the outer periphery of each of the rotor stacks 13A and 13B at pitches of a predetermined angle. The permanent magnet 13C is disposed between the rotor stacks 13A and 13B and is magnetized in a depth direction thereof so that magnetic poles of different polarities appear on the respective plurality of small teeth.

The hollow rotary shaft 3 has a shape of a hollow cylinder, and includes opening portions 3C and 3D through which both ends (one axial end 3A and the other axial end 3B) of the hollow rotary shaft 3 open. The hollow rotary shaft 3 has an inner diameter that allows the output screw shaft 5, which will be described later, may axially reciprocate inside the hollow rotary shaft 3. An outer peripheral portion 3E of the hollow rotary shaft 3 includes a small diameter portion 3F for fixing thereon the rotor portion 13 and a large diameter portion 3G having a diameter larger than the diameter of the small diameter portion 3F. A nut body 7A of the screw nut 7 which will be described later, is fitted with the large diameter portion 3G. The two rotor stacks 13A and 13B of the rotor portion 13 are fixed on the small diameter portion 3F of the hollow rotary shaft 3. The hollow rotary shaft 3 is installed in the rotary motor portion 1 with the small diameter portion 3F fitted with an inner peripheral surface 13D of the rotor portion 13. A step portion 3H for fitting therein a ball bearing 4 operable to rotatably support the other axial end 3B of the hollow rotary shaft 3 is formed in the other axial end 3B of the hollow rotary shaft 3.

The output screw shaft 5 is disposed coaxially with the hollow rotary shaft 3, and is operable to move inside the hollow rotary shaft 3 as the output shaft of the linear actuator. Specifically, the output screw shaft 5 is screwed with the screw nut 7 and makes a reciprocating linear movement in an axial direction due to rotation of the hollow rotary shaft 3.

The screw nut 7 comprises the nut body 7A fitted in the opening portion 3C of the hollow rotary shaft 3, a screw portion 7B located inside the hollow rotary shaft 3 and screwed onto the output screw shaft 5, and a flange portion 7C unitarily formed with the screw portion 7B and projecting radially outwardly from the one axial end 3A of the hollow rotary shaft 3.

The thrust radial bearing 9 comprises an inner race 9A and an outer race 9B each formed into a ring, and a plurality of rolling elements disposed between the inner race 9A and the outer race 9B. The thrust radial bearing 9 is operable to rotatably support the hollow rotary shaft 3 on the side of the one axial end 3A of the hollow rotary shaft 3 through a structure that prevents the hollow rotary shaft 3 from moving in the axial direction (thrust direction). Specifically, the inner race 9A of the thrust radial bearing 9 is fixed on the large diameter portion 3G on the side of the one axial end 3A of the hollow rotary shaft 3, and the outer race 9B is fixed to an intermediate bracket 27.

In the linear actuator in this embodiment, the hollow rotary shaft 3 is formed by combining the rotor fixing portion 19 and the bearing fitting portion 21. The rotor portion 13 of the rotary motor portion 1 is fixed on the rotor fixing portion 19. Further, the rotor fixing portion 19 is unitarily formed with an abutment portion 19A that abuts onto an end surface 9D of the inner race 9A of the thrust radial bearing 9 that is opposite to an end surface 9C located on the one axial end side. On the other hand, the thrust radial bearing 9 is fitted on an outer peripheral portion 21A of the bearing fitting portion 21, and the screw nut 7 is fixed to an inner peripheral portion 21B of the bearing fitting portion 21. The rotor fixing portion 19 and the bearing fitting portion 21 are coupled with one or more screw members 23 which are inserted into the hollow rotary shaft 3 from the one axial end 3A of the hollow rotary shaft 3 and axially extend inside the bearing fitting portion 21 and the rotor fixing portion 19. The one or more screw members 23 are arranged in a peripheral direction at predetermined intervals. It suffices that at least one of the screw members 23 is provided for coupling the rotor fixing portion 19 and the bearing fitting portion 21. The bearing fitting portion 21 is configured to be unitarily formed with an abutment portion 21C that abuts onto the end surface 9C of the inner race 9A of the thrust radial bearing 9 that is located on the one axial end side. The flange portion 7C of the screw nut 7 is fixed on the abutment portion 21C of the bearing fitting portion 21.

When the rotor fixing portion 19 and the bearing fitting portion 21 are combined to form the hollow rotary shaft 3 as mentioned above, the thrust radial bearing 9 may be fixed to the one axial end 3A of the hollow rotary shaft 3 without using a lock nut. For that reason, by using the linear actuator shown in FIG. 1, manufacturing cost of the linear actuator may be greatly reduced. Further, since the structure without using the lock nut is adopted in the linear actuator in FIG. 1, the need for considering tightening workability of the lock nut and the like that have become the problems in the conventional linear actuators is eliminated. Still further, the abutment portion 21C of the bearing fitting portion 21 abuts onto the end surface 9C of the inner race 9A of the thrust radial bearing 9 that is located on the one axial end side, in this embodiment. The thrust radial bearing 9 may therefore be firmly fixed between the hollow rotary shaft 3 and the screw nut 7 even if the lock nut is not used. In this embodiment in particular, the abutment portion 21C of the bearing fitting portion 21 supports the end surface 9C of the inner race 9A of the thrust radial bearing 9 on the one axial end side, and the abutment portion 19A of the rotor fixing portion 19 supports the end surface 9D of the inner race 9A of the thrust radial bearing 9 that is located on an opposite side to the one axial end side. Thus, when the rotor fixing portion 19 and the bearing fitting portion 21 are combined, the thrust radial bearing 9 may be prevented from moving.

In the example in FIG. 1, a first end bracket 25, an intermediate bracket 27, and a second end bracket 29 are provided. The first end bracket 25 is fitted with an end 15C of the stator core 15 that is located on the opposite side to the one axial end side to fix the ball bearing 4. Specifically, the ball bearing 4 is fitted between the step portion 3H of the hollow rotary shaft 3 and a cylindrical portion 25B unitarily formed with an inner wall portion 25A of the first end bracket 25. A through hole 25D for drawing out a lead wire 1A connected to the rotary motor portion 1 for supplying electric power to the rotary motor portion 1 is formed in a side wall portion 25C of the first end bracket 25.

The intermediate bracket 27 is fitted with an end 15B of the stator core 15 on the one axial end side, and is also fitted with the outer race 9B of the thrust radial bearing 9. In the configuration in FIG. 1, a step 15E is formed at an end 15D of the radially outward outer peripheral surface of the stator core 15 on the axial end side. An end 27B of the intermediate bracket 27 that is located on the opposite side to the one axial end side is fitted with the step 15E. A first abutment portion 27C that abuts onto an end 9F of the outer race 9B of the thrust radial bearing 9 located on the opposite side to the one axial end side and a second abutment portion 27D that abuts onto a bearing retaining plate 31 made of metal located on the one axial end side are formed inside the intermediate bracket 27. The bearing retaining plate 31 abuts on an end 9E of the outer race 9B of the thrust radial bearing 9 on the one axial end side.

The second end bracket 29 includes a through hole 29A through which the output screw shaft 5 passes, and is fitted with an end 27A of the intermediate bracket 27 on the axial end side to partly cover the screw nut 7 and the output screw shaft 5. The second end bracket 29 is fixed to four corners of the intermediate bracket 27 using four screws not shown.

With such arrangement, the thrust radial bearing 9 is supported by the rotor fixing portion 19, the bearing fitting portion 21, the intermediate bracket 27, and the bearing retaining plate 31. That is, with the inner race 9A of the thrust radial bearing 9 supported by the rotor fixing portion 19 and the bearing fitting portion 21, the outer race 9B of the thrust radial bearing 9 is further supported by the intermediate bracket 27 and the bearing retaining plate 31. Movement of the thrust radial bearing 9 may therefore be reliably prevented. Further, even when the structure without using the lock nut is adopted as in this embodiment, the casing of the linear actuator (stepping motor) may be formed by the first end bracket 25, the stator core 15, the intermediate bracket 27, and the second end bracket 29 while securely fixing the thrust radial bearing 9.

Figure 2:
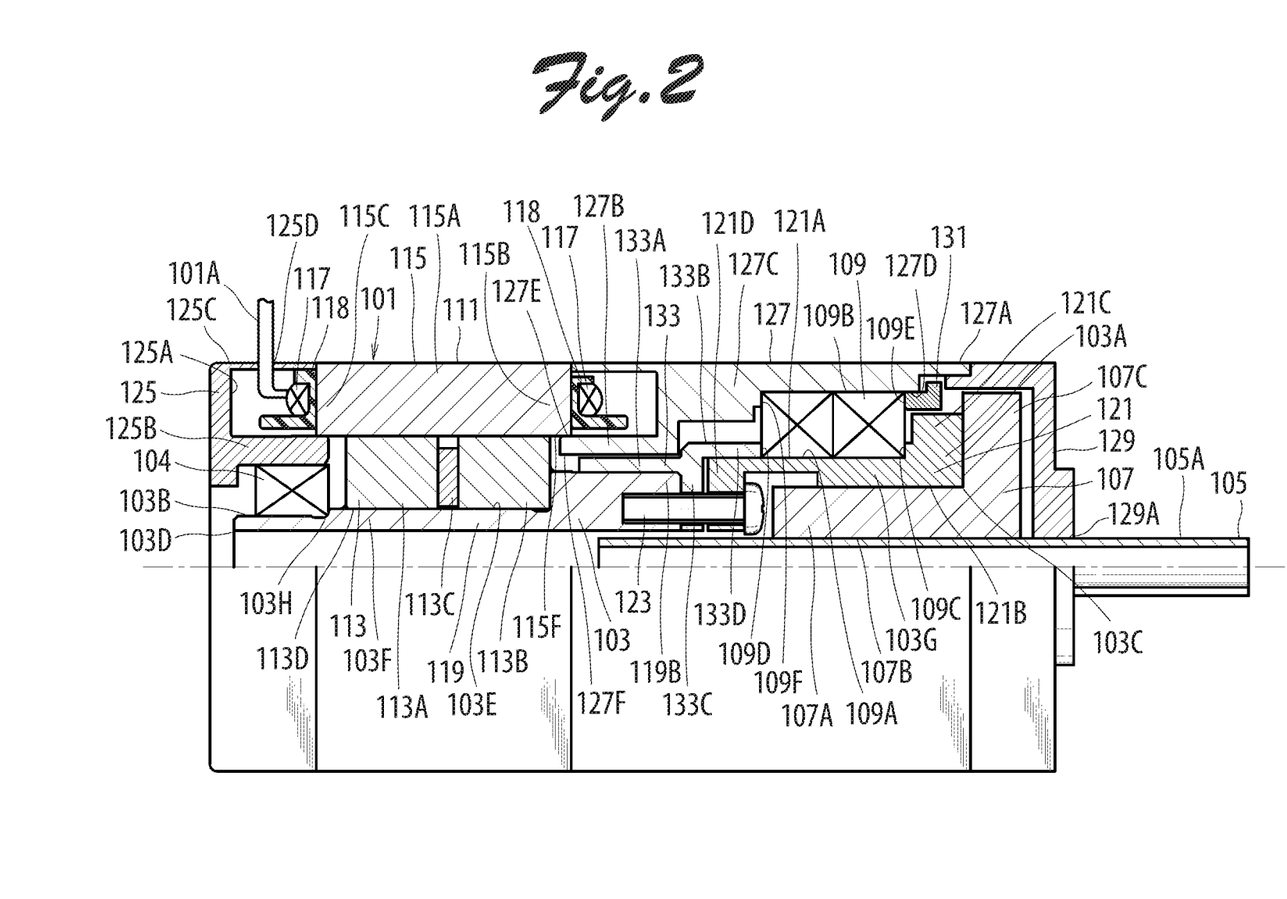
FIG. 2 is a half sectional view showing another example of a linear actuator in an embodiment of the present invention.

FIG. 2 is a half sectional view showing a configuration of a linear actuator in another embodiment of the present invention. Components in FIG. 2 common to those of the linear actuator in FIG. 1 are given reference numerals obtained by adding 100 to the reference numerals in FIG. 1, and description of the components in the second embodiment which are common to those in FIG. 1 will be omitted. In the configuration in FIG. 2, a joint member 133 is disposed between the rotor fixing portion 119 and the bearing fitting portion 121. The joint member 133 includes a first fitting concave portion 133A, a second fitting concave portion 133B, and a partition portion 133C. The first fitting concave portion 133A is fitted with an end 119B of the rotor fixing portion 119 that is located on one axial end side of a hollow rotary shaft 103. The second fitting concave portion 133B is fitted with an end 121D of the bearing fitting portion 121 that is located on an opposite side to the one axial end side (opposite side to the side where an end 121C is formed, with respect to an outer peripheral portion 121A). The partition portion 133C is interposed between the rotor fixing portion 119 (end 119B on the axial one end side) fitted with the first fitting concave portion 133A and the bearing fitting portion 121 (end 121D that is located on the opposite side to the axial one end side) fitted with the second fitting concave portion 133B. The bearing fitting portion 121, the joint member 133, and the rotor fixing portion 119 are coupled with a plurality of screw members 123 axially extending inside the bearing fitting portion 121, the partition portion 133C of the joint member 133, and the rotor fixing portion 119 and arranged in a peripheral direction at predetermined intervals. It suffices that at least one of the screw members 123 is provided for coupling the bearing fitting portion 121, the joint member 133, and the rotor fixing portion 119. When the joint member 133 is used as in this embodiment, positioning of the rotor fixing portion 119 and the bearing fitting portion 121 is facilitated. Further, since the rotor fixing portion 119 and the bearing fitting portion 121 may be securely assembled through the joint member 133, a variation in the order of assembly of the linear actuator may be increased.

In the configuration in FIG. 2, the joint member 133 is configured to be unitarily formed with an abutment portion 133D that abuts onto an end surface 109D of an inner race 109A of a thrust radial bearing 109 that is opposite to an end surface 109C located on the one axial end side. Provision of the abutment portion 133D as mentioned above at the joint member 133 causes the end surface 109C of the inner race 109A of the thrust radial bearing 109 on the one axial end side to be supported by the abutment portion 121C of the bearing fitting portion 121 and causes the end surface 109D of the inner race 109A of the thrust radial bearing 109 that is opposite to the end surface 109C located on the one axial end side to be supported by the abutment portion 133D of the joint member 133. For that reason, even when the joint member 133 is used as in this another embodiment to combine the rotor fixing portion 119 and the bearing fitting portion 121, the thrust radial bearing 109 may be prevented from moving.

A fitted portion 127F including a reference surface 127E in contact with the inner peripheral surface of a stator core 115 is unitarily formed with an end 127B of the intermediate bracket 127 that is located on the opposite side to the one axial end side. Dimensions of the reference surface 127E are defined so that the fitted portion 127F of the intermediate bracket 127 contacts an inner peripheral surface 115F of the stator core 115 without contacting magnetic pole portions (pole teeth) in the stator core 115 that are not shown. When a fitting structure fitting the stator core 115 and the intermediate bracket 127 together on the side of the inner peripheral surface 115F of the stator core 115 as in the configuration in FIG. 2 is adopted, positioning of the stator core 115 and the intermediate bracket 127 may be performed at a location closest to the axial core of the hollow rotary shaft 103 in a radial direction. That is, as compared with the configuration shown in FIG. 1 (where positioning of the stator core 15 and the intermediate bracket 27 is performed at a location farthest from the axial core of the hollow rotary shaft 3 in the radial direction), the configuration in FIG. 2 may make it difficult for an axial deviation to occur between the hollow rotary shaft 103 and the output screw shaft 105. Further, use of the configuration in FIG. 2 may increase a contact surface between the stator core 115 and the intermediate bracket 127. Consequently, motor rigidity of a rotary motor portion 101 may be increased. Oscillation and noise may therefore be reduced.

An example method of assembling the linear actuator (stepping motor) shown in FIG. 2 will be sequentially described. The method comprising:

(A) fitting the thrust radial bearing 109 on the bearing fitting portion 121;

(B) fitting the joint member 133 with each of the bearing fitting portion 121 and the thrust radial bearing 109;

(C) fitting the intermediate bracket 127 on the thrust radial bearing 109 and the joint member 133;

(D) fitting the bearing retaining plate 131 between the bearing fitting portion 121 and the intermediate bracket 127;

(E) fitting the rotor portion 113 on the rotor fixing unit 119;

(F) further fitting a ball bearing 104 with the rotor portion 113 fixed on the rotor fixing portion 119;

(G) coupling the bearing fitting portion 121, the joint member 133, and the rotor fixing portion 119 with the screw members 123;

(H) fitting the first end bracket 125 with the stator portion 111 to fix the first end bracket 125 with a screw member not shown;

(I) fitting in the hollow rotary shaft 103 a structure where the output screw shaft 105 is screwed with the screw nut 107; and (J) fixing the second end bracket 129 to the intermediate bracket 127.

In the conventional linear actuators, the thrust radial bearing can be fixed by the lock nut only in a stage of a semi-finished product where main portions (rotary motor portion, hollow rotary shaft, output screw shaft, screw nut, and thrust radial bearing) of the linear actuator are combined. A variation in the order of assembly of the linear actuator is therefore limited. On contrast therewith, when the linear actuator in FIG. 2 is manufactured, the thrust radial bearing 109 may be fixed irrespective of when the rotary motor portion 101 is mounted (before or after the rotary motor portion 101 is mounted). A variation in the order of assembly of the linear actuator (stepping motor) may therefore be increased. This effect may be implemented only by adopting the joint member 133 as in the configuration in FIG. 2.

The above description has specifically been made about the embodiments of the present invention. The present invention, is not however, limited to these embodiments, and may be of course modified within the technical concept of the present invention.

INDUSTRIAL APPLICABILITY

According to the present invention, the rotor fixing portion and the bearing fitting portion are combined to form the hollow rotary shaft. The thrust radial bearing may thus be fixed to the one axial end side of the hollow rotary shaft, without using a lock nut. For that reason, the manufacturing cost of the linear actuator may be greatly reduced. Further, since the structure without using the lock nut is adopted, the need for considering the problems of tightening workability of the lock nut and the like that have arisen in the conventional linear actuators is eliminated. Further, the abutment portion of the bearing fitting portion abuts onto the end surface of the inner race of the thrust radial bearing that is located on the one axial end side. The thrust bearing may thereby be firmly fixed between the hollow rotary shaft and the screw nut, even if the lock nut is not used.

What is claimed is:

1. A linear actuator comprising:
   a rotary motor portion including:
   a rotor; and
   a hollow rotary shaft formed by combining at least:
      a rotor fixing portion on which the rotor is fixed; and
      a bearing fitting portion;
   an output screw shaft disposed coaxially with the hollow rotary shaft and operable to move inside the hollow rotary shaft;
   a screw nut fixed to the bearing fitting portion and including:
      a screw portion located inside the hollow rotary shaft and screwed onto the output screw shaft; and
      a flange portion unitarily formed with the screw portion and projecting radially outwardly from one axial end of the hollow rotary shaft;
   a thrust radial bearing including an inner race and an outer race and operable to rotatably support the hollow rotary shaft on the one axial end side, the thrust radial bearing being fitted on an outer periphery of the bearing fitting portion of the hollow rotary shaft, wherein:
   the rotor fixing portion and the bearing fitting portion are coupled with one or more screw members which are inserted into the hollow rotary shaft from the one axial end and axially extend inside the bearing fitting portion and the rotor fixing portion;
   the bearing fitting portion is unitarily formed with an abutment portion which abuts onto an end surface of the inner race of the thrust radial bearing that is located on the one axial end side; and
   the flange portion of the screw nut is fixed on the abutment portion of the bearing fitting portion.

2. The linear actuator according to claim 1, wherein:
   the rotor fixing portion is unitarily formed with an abutment portion which abuts onto an end surface of the inner race of the thrust radial bearing that is opposite to the end surface located on the one axial end side.

3. The linear actuator according to claim 1, further comprising a joint member disposed between the rotor fixing portion and the bearing fitting portion, wherein:
   the joint member includes:
      a first fitting concave portion fitted with an end of the rotor fixing portion that is located on the one axial end side;
      a second fitting concave portion fitted with an end of the bearing fitting portion that is located on an opposite side to the one axial end side; and
      a partition portion located between the rotor fixing portion fitted in the first fitting concave portion and the bearing fitting portion fitted in the second fitting concave portion; and
   the one or more screw members axially extend inside the bearing fitting portion, the partition portion of the joint member, and the rotor fixing portion to couple the bearing fitting portion, the joint member, and the rotor fixing portion.

4. The linear actuator according to claim 3, wherein
   the joint member is unitarily formed with an abutment portion which abuts onto an end surface of the inner race of the thrust radial bearing that is opposite to the end surface located on the one axial end side.

5. The linear actuator according to claim 1, wherein:
   the rotary motor portion includes:
      a stator portion constituted from a stator core and a winding portion attached to the stator core; and
      a rotor portion fixed to the rotor fixing portion; and
   the linear actuator further includes:
      a first end bracket fitted with an end of the stator core that is located on an opposite side to the one axial end side;
      an intermediate bracket fitted with an end of the stator core that is located on the one axial end side and is also fitted with the outer race of the thrust radial bearing, the intermediate bracket having a first abutment portion and a second abutment portion formed therein, the first abutment portion abutting onto an end surface of the outer race of the thrust radial bearing that is located on the opposite side to the one axial end side, and the second abutment portion abutting onto a bearing retaining plate in abutment with an end surface of the outer race of the thrust radial bearing that is located on the one axial end side; and
      a second end bracket fitted with an end of the intermediate bracket that is located on the one axial end side, with the output screw shaft penetrating therethrough.

6. The linear actuator according to claim 1, wherein:
   the rotary motor portion includes:
      a stator portion constituted from a stator core and a winding portion attached to the stator core; and
      a rotor portion fixed to the rotor fixing portion; and
   the linear actuator further includes:
      a first end bracket fitted with an end of the stator core that is located on an opposite side to the one axial end side;
      an intermediate bracket fitted with an end of the stator core that is located on the one axial end side and is also fitted with the outer race of the thrust radial bearing, the intermediate bracket having a first abutment portion and a second abutment portion formed therein, the first abutment portion abutting onto an end surface of the outer race of the thrust radial bearing that is located on the opposite side to the one axial end side, and the second abutment portion abutting onto a bearing retaining plate in abutment with an end surface of the outer race of the thrust radial bearing that is located on the one axial end side; and a second end bracket fitted with an end of the intermediate bracket that is located on the one axial end side, with the output screw shaft penetrating therethrough; and a fitted portion including a reference surface in contact with an inner peripheral surface of the stator core is unitarily formed with an end of the intermediate bracket that is located on the opposite side to the one axial end side.

7. The linear actuator according to claim 2, wherein:
the rotary motor portion includes:
   a stator portion constituted from a stator core and a winding portion attached to the stator core; and
   a rotor portion fixed to the rotor fixing portion; and
the linear actuator further includes:
   a first end bracket fitted with an end of the stator core that is located on an opposite side to the one axial end side;
   an intermediate bracket fitted with an end of the stator core that is located on the one axial end side and is also fitted with the outer race of the thrust radial bearing, the intermediate bracket having a first abutment portion and a second abutment portion formed therein, the first abutment portion abutting onto an end surface of the outer race of the thrust radial bearing that is located on the opposite side to the one axial end side, and the second abutment portion abutting onto a bearing retaining plate in abutment with an end surface of the outer race of the thrust radial bearing that is located on the one axial end side; and
   a second end bracket fitted with an end of the intermediate bracket that is located on the one axial end side, with the output screw shaft penetrating therethrough.

8. The linear actuator according to claim 2, wherein:
the rotary motor portion includes:
   a stator portion constituted from a stator core and a winding portion attached to the stator core; and
   a rotor portion fixed to the rotor fixing portion; and
the linear actuator further includes:
   a first end bracket fitted with an end of the stator core that is located on an opposite side to the one axial end side;
   an intermediate bracket fitted with an end of the stator core that is located on the one axial end side and is also fitted with the outer race of the thrust radial bearing, the intermediate bracket having a first abutment portion and a second abutment portion formed therein, the first abutment portion abutting onto an end surface of the outer race of the thrust radial bearing that is located on the opposite side to the one axial end side, and the second abutment portion abutting onto a bearing retaining plate in abutment with an end surface of the outer race of the thrust radial bearing that is located on the one axial end side; and
   a second end bracket fitted with an end of the intermediate bracket that is located on the one axial end side, with the output screw shaft penetrating therethrough; and
a fitted portion including a reference surface in contact with an inner peripheral surface of the stator core is unitarily formed with an end of the intermediate bracket that is located on the opposite side to the one axial end side.

9. The linear actuator according to claim 3, wherein:
the rotary motor portion includes:
   a stator portion constituted from a stator core and a winding portion attached to the stator core; and
   a rotor portion fixed to the rotor fixing portion; and
the linear actuator further includes:
   a first end bracket fitted with an end of the stator core that is located on an opposite side to the one axial end side;
   an intermediate bracket fitted with an end of the stator core that is located on the one axial end side and is also fitted with the outer race of the thrust radial bearing, the intermediate bracket having a first abutment portion and a second abutment portion formed therein, the first abutment portion abutting onto an end surface of the outer race of the thrust radial bearing that is located on the opposite side to the one axial end side, and the second abutment portion abutting onto a bearing retaining plate in abutment with an end surface of the outer race of the thrust radial bearing that is located on the one axial end side; and
   a second end bracket fitted with an end of the intermediate bracket that is located on the one axial end side, with the output screw shaft penetrating therethrough.

10. The linear actuator according to claim 3, wherein:
the rotary motor portion includes:
   a stator portion constituted from a stator core and a winding portion attached to the stator core; and
   a rotor portion fixed to the rotor fixing portion; and
the linear actuator further includes:
   a first end bracket fitted with an end of the stator core that is located on an opposite side to the one axial end side;
   an intermediate bracket fitted with an end of the stator core that is located on the one axial end side and is also fitted with the outer race of the thrust radial bearing, the intermediate bracket having a first abutment portion and a second abutment portion formed therein, the first abutment portion abutting onto an end surface of the outer race of the thrust radial bearing that is located on the opposite side to the one axial end side, and the second abutment portion abutting onto a bearing retaining plate in abutment with an end surface of the outer race of the thrust radial bearing that is located on the one axial end side; and
   a second end bracket fitted with an end of the intermediate bracket that is located on the one axial end side, with the output screw shaft penetrating therethrough; and
   a fitted portion including a reference surface in contact with an inner peripheral surface of the stator core is unitarily formed with an end of the intermediate bracket that is located on the opposite side to the one axial end side.

11. The linear actuator according to claim 4, wherein:
the rotary motor portion includes:
   a stator portion constituted from a stator core and a winding portion attached to the stator core; and
   a rotor portion fixed to the rotor fixing portion; and
the linear actuator further includes:
   a first end bracket fitted with an end of the stator core that is located on an opposite side to the one axial end side;
   an intermediate bracket fitted with an end of the stator core that is located on the one axial end side and is also fitted with the outer race of the thrust radial bearing, the intermediate bracket having a first abutment portion and a second abutment portion formed therein, the first abutment portion abutting onto an end surface of the outer race of the thrust radial bearing that is located on the opposite side to the one axial end side, and the second abutment portion abutting onto a bearing retaining plate in abutment with an end surface of the outer race of the thrust radial bearing that is located on the one axial end side; and
   a second end bracket fitted with an end of the intermediate bracket that is located on the one axial end side, with the output screw shaft penetrating therethrough.

12. The linear actuator according to claim 4, wherein:
the rotary motor portion includes:
- a stator portion constituted from a stator core and a winding portion attached to the stator core; and
- a rotor portion fixed to the rotor fixing portion; and the linear actuator further includes:
- a first end bracket fitted with an end of the stator core that is located on an opposite side to the one axial end side;
- an intermediate bracket fitted with an end of the stator core that is located on the one axial end side and is also fitted with the outer race of the thrust radial bearing, the intermediate bracket having a first abutment portion and a second abutment portion formed therein, the first abutment portion abutting onto an end surface of the outer race of the thrust radial bearing that is located on the opposite side to the one axial end side, and the second abutment portion abutting onto a bearing retaining plate in abutment with an end surface of the outer race of the thrust radial bearing that is located on the one axial end side; and
- a second end bracket fitted with an end of the intermediate bracket that is located on the one axial end side, with the output screw shaft penetrating therethrough; and a fitted portion including a reference surface in contact with an inner peripheral surface of the stator core is unitarily formed with an end of the intermediate bracket that is located on the opposite side to the one axial end side.

* * * * *